United States Patent [19]

Narang et al.

[11] Patent Number: 5,495,601
[45] Date of Patent: Feb. 27, 1996

[54] METHOD TO OFF-LOAD HOST-BASED DBMS PREDICATE EVALUATION TO A DISK CONTROLLER

[75] Inventors: Inderpal S. Narang, Saratoga; Balakrishna R. Iyer; Chandrasekaran Mohan, both of San Jose, all of Calif.

[73] Assignee: International Business Machines Corporation, Armonk, N.Y.

[21] Appl. No.: 989,447

[22] Filed: Dec. 11, 1992

[51] Int. Cl.⁶ .................................................. G06F 17/30
[52] U.S. Cl. ........................... 395/600; 395/495; 395/650; 395/700
[58] Field of Search .................................. 395/600, 650, 395/700, 495, 800

[56] References Cited

U.S. PATENT DOCUMENTS

| | | | |
|---|---|---|---|
| 4,967,341 | 10/1990 | Yamamoto et al. | 395/600 |
| 5,043,871 | 8/1991 | Nishigaki et al. | 364/200 |
| 5,249,262 | 9/1993 | Baule | 395/66 |
| 5,287,496 | 2/1994 | Chen et al. | 395/600 |
| 5,317,731 | 5/1994 | Dias et al. | 395/600 |

OTHER PUBLICATIONS

T. Kitamura et al., A Relational Database Machine Architecture Based on an Attached Processor Approach, NTT Communications & Info. Processing Lab., pp. 663–671, 1987.

C. Mohan, Commit LSN: A Novel and Simple Method for Reducing Locking and Latching in Transaction Processing Systems, Proceedings of the 16th VLDB Conf., Brisbane, Australia , pp. 1–14, Aug. 1990.

J. Kreybig et al., An Intelligent Disk Controller—A Processor System for File Management and Query Functions, No.—Holland, Microprocessing & Microprogramming 25 pp. 55–60, 1989.

E. A. Ozkarahan et al., On–The–Fly and Background Data Filtering System for Database Architectures, New Generation Copmuting, vol. 5, pp. 281–314, 1987.

K. I. Yu et al., The Fast Data Finder—An Architecture for Very High Speed Data Search and Dissemination, IEEE CH2031, pp. 167–174, 1984.

C. Mohan, Transaction Processing System and Method with Reduced Locking. Ser. #07/480,700 filed Feb. 15, 1990 Now US Patent #5,247,672.

*Primary Examiner*—Thomas G. Black
*Assistant Examiner*—Paul R. Lintz
*Attorney, Agent, or Firm*—James C. Pintner; Philip Blair

[57] ABSTRACT

A method is disclosed for a database system for [off-loading] off-loading, to disk [controller] controller, the extraction of committed [data involving the] data. The system first [picking] picks a Commit_LSN value and [insuring] insures all the data modified prior to the Commit_LSN value is processed following the DBMS policy of reducing some disk I/Os or not for the modified pages cached in the system. If the policy is not to do disk I/Os for such [pages] pages, then the system places the identifiers of those pages in an ignore list. Otherwise, the system writes those pages to disk and empties the ignore list. [After which] Afterwards, the system forwards the ignore list and the Commit$_{LSN}$ along with information regarding the data to be processed to the controller. The controller performs the off-load function by reading from disk every page identified by the system except those in the ignore [list] list, and [determining] determining, for each [page] page, if the page's Page_LSN value is less than the Commit_LSN. If it [is] is, then the controller processes the page and adds any qualifying data from that page to a defined answer set. Otherwise, the controller adds the Page_ID for that page to a defined exception list. The controller than passes the answer set and the exception list to the system. The system processes the pages identified in the exception list and those in the ignore list. The system consolidates these answers with the answer set returned by the controller for presentation to the user.

16 Claims, 4 Drawing Sheets

METHOD TO OFF-LOAD HOST-BASED DBMS PREDICATE EVALUATION TO A DISK CONTROLLER

FIELD OF THE INVENTION

Broadly conceived, the present invention relates to host-based DBMS predicate evaluation, and in particular, to methods for off-loading host-based predicate evaluations to a disk controller.

BACKGROUND HISTORY

In the field of database systems, large amounts of information are constantly being retrieved, updated, and restored. Databases find uses in a variety of information intensive areas wherein large amounts of data need to be stored and accessed.

One such area is in transaction processing such as a bank teller machine which accesses a large central database in which all customer account information is stored. Through the bank teller machine, a customer performs a transaction such as withdrawing a certain amount of funds that exist in the customer's account. The database management system (or DBMS), which controls access of all the transactions to the database, interprets the customer's account action, and inquires as to whether the desired amount of funds to be withdrawn exist in the customer's account. If the funds are shown to exist in that database's files, the information for that account is updated by the amount desired to be withdrawn. The updated information is then restored to the database.

One problem in the art with on-line transaction processing such as the bank teller machine is that multiple teller machines must access the same database of information. If two bank teller machines simultaneously receive requests to withdraw a certain amount of funds from the same customer's account then the account may be overdrawn because both machines have, at the same moment in time, identical account information. As a result, the art has developed locking protocols for the DBMS such that one record is locked as one transaction is being processed with that record so that duplicate copies of the same record do not exist simultaneously.

The locking protocols known in the art take a variety of forms and can be CPU intensive when used concurrently with the other activities of the host processor. The DBMS host processing unit has to perform locking checks according to the protocol implemented in the database system in addition to all the retrieval, updating, and storage intensive work. Of particular interest to an understanding of the background of this invention is the Commit_LSN idea, a discussion of which can be found in Mohan, "COMMIT_LSN: A Novel and Simple Method for Reducing Locking and Latching in Transaction Processing Systems", Proceedings of VLDB, (AUG 1990).

In the art, database users query millions of pages of information on disk to gather information to make mission critical decisions. Such applications are known as decision support applications. For instance, a marketing person for a large retail manufacturer wants to cross reference millions of pages of files on disk in order to determine which was the best performing product over the last fiscal quarter. To do so, the DBMS would have to access most of the pages it has stored in the database to answer the query before filtering and assembling the desired information for presentation to the user. Meanwhile, the individual stores and manufacturing centers of the large retail chain would have to be able to access the database for information retrieval and updating. Due to the processing of the decision support query the host processor can become extremely busy. If the host becomes too busy, the overall response time for the entire database system degenerates.

Therefore, a basic problem in the art has been to try to off-load the amounts and kinds of work that have been traditionally performed by the host processor to specialized processors or disk controllers so as not to over-utilize the host and to lessen memory demands on the database system while allowing simultaneous updates to the same data by the host yet does not expose uncommitted data to a query which may be partially or wholly processed by the off-load processor.

SUMMARY AND OBJECTS OF THE INVENTION

The present invention relates to methods for off-loading host-based predicate evaluations to a disk controller.

It is a primary object of the present invention to provide a method for off-loading host-based predicate evaluations to a controller so as to reduce the amount of data that gets processed at the host in order to reduce the amount of memory and processing power consumed therein.

It is another primary object of the present invention to provide a method which moves processing on non-reused data for ad-hoc query processing or report generation to the disk subsystem.

It is another object of the present invention to provide a method which allows concurrent updates by other transactions yet does not expose uncommitted data to a query which may be partially or wholly processed by the off-load processor.

It is yet another object of the present invention to eliminate the need for any locking functionality at the disk controller and to minimize the amount of synchronization between host and controller.

Briefly and to achieve the foregoing objects in accordance with the present invention as embodied and broadly described herein, a method for a database system to off-load to a controller the extraction of committed data is disclosed. The method involves the system first picking a Commit_LSN value and insuring all the data modified prior to the Commit_LSN value is processed following the DBMS policy of reducing some disk I/Os or not for the modified pages cached in the system. If the policy is not to do disk I/Os for such pages then the system places the identifiers of those pages in an ignore list. Otherwise, the system writes those pages to disk and empties the ignore list. After which, the system forwards the ignore list and the Commit_LSN along with information regarding the data to be processed to the controller. The controller performs the off-load function by reading from disk every page identified by the system except those in the ignore list and determining for each page if the page's Page_LSN value is less than the Commit_LSN. If it is then the controller processes the page and adds any qualifying data from that page to a defined answer set. Otherwise, the controller adds the Page_ID for that page to a defined exception list. The controller then passes the answer set and the exception list to the system. The system processes the pages identified in the exception list and those in the ignore list which were ignored by the controller. The system consolidates these answers with the answer set returned by the controller for presentation to the user.

It is an advantage of the present invention to provide the ability to exploit different hardware technologies to act as the host processor and off-load processor so as to reduce the price/performance ratio in the overall computing system and which better utilizes the host storage and processing power, better supports host-based activities such as on-line transaction processing, and reduces the channel utilization.

It is yet another advantage of the present invention to provide a method wherein the buffer hit ratio in the host is improved for on-line transaction processing.

Additional objects and advantages of the present invention will be set forth in the description which follows, and in part will be obvious from the description or may be learned by the practice of this invention. The objects and advantages of this invention as described herein may be realized and obtained by means particularly pointed out and distinctly claimed in the appended claims taken in conjunction with the accompanying drawings and the detailed specification.

BRIEF DESCRIPTION OF THE DRAWINGS

In order that the manner in which the above-recited and other advantages and objects of the present invention are obtained, a more particular description of this invention, briefly described above, will be rendered by reference to a specific embodiment thereof which is illustrated in the appended drawings. Understanding that these drawings depict only a typical embodiment of the present invention and are not therefore to be considered in any way limiting of its scope, this invention will be described and explained with additional specificity and detail through the use of the accompanying drawings, in which.

DETAILED DESCRIPTION OF THE PREFERRED EMBODIMENT

The present invention is directed to methods for off-loading host-based predicate evaluations to a disk controller in order to reduce the amount of data that gets processed at the host yet does not expose uncommitted data to a query which may be partially or wholly processed by the off-load processor.

In order to discuss the preferred embodiment of the present method for off-loading, it is important that a common understanding with respect to some terms of art be achieved.

Figure 1:
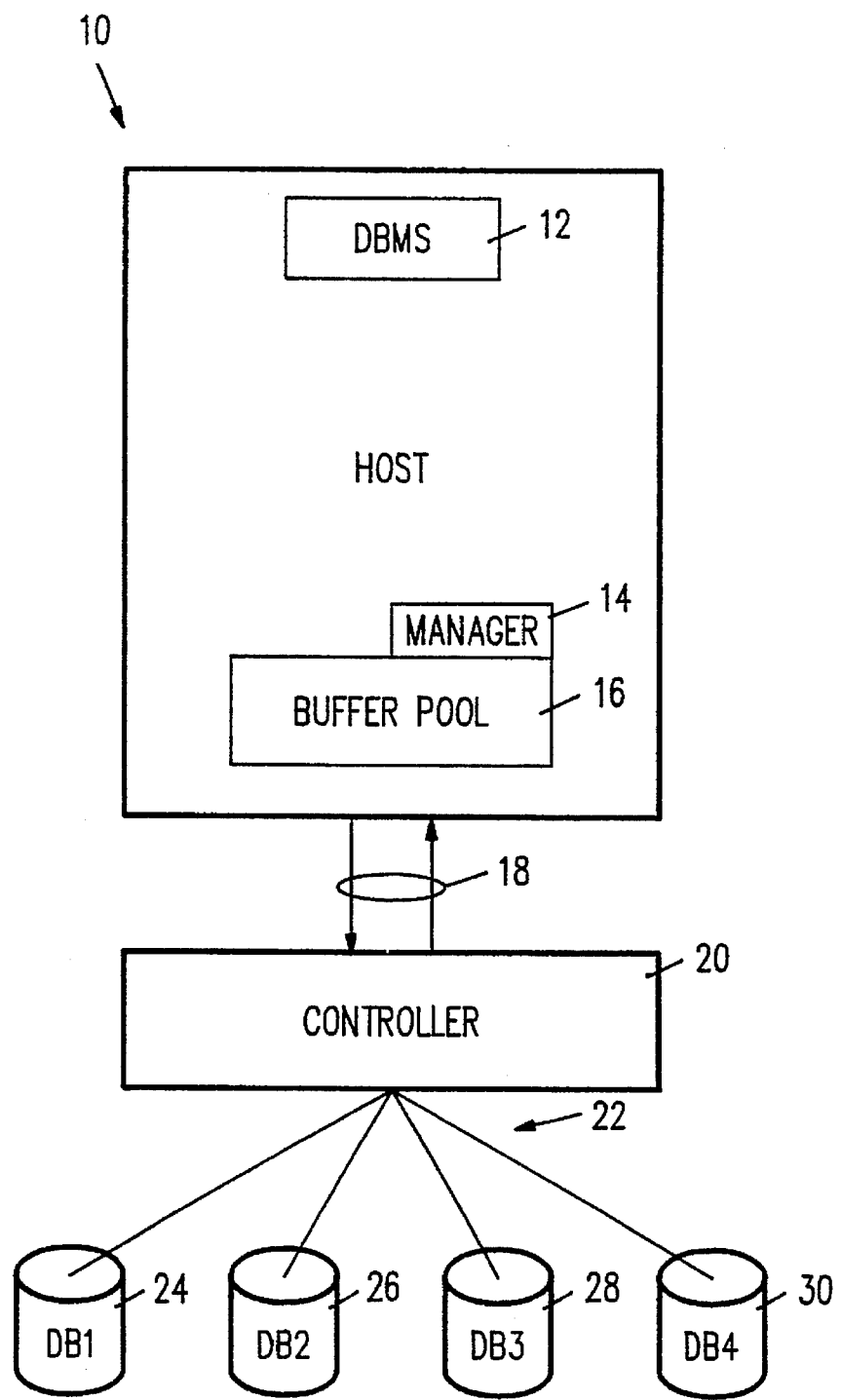
FIG. 1 is a schematic illustration of a host database system configured with a DBMS, a buffer pool, and a buffer manager all in communication with a controller which in turn accesses four separate database disks.

With reference to FIG. 1, the database system, as shown generally at 10, for illustration purposes is configured with a host having a Database Management System 12 (or DBMS) implemented therein and having a buffer manager 14 managing a buffer pool 16 used for caching pages of data returned by the controller 20. It should be understood that the buffer manager, DBMS, and the buffer pool described and illustrated herein are merely representative of a host's overall computational system. These sections of the host are either part of a large host program or are separate sections in communication with and accessible by each other's structures. Therefore and because these sections are system specific, no discussion herein is directed to how these systems are constructed or implemented.

The host 10 is in communication with the controller 20 through a two-way communication channel collectively designated at 18. The controller can be any processor or disk controller having logic and memory workspace built-in or readily accessible. The method of the present invention described herein involves, in part, using the controller's logic and memory workspace (not shown) such that off-load processing can be effectuated and insuring that the host receive only committed data in answer to the host's predicate evaluation. As discussed, the present invention is directed to off-loading host-based predicate evaluations to a disk controller in order to reduce the amount of data that gets processed at the host yet does not expose uncommitted data to a query which may be partially or wholly processed by the off-load processor.

As is also shown in FIG. 1, the controller 20 individually accesses four separate disks, at 24, 26, 28, and 30, each of which is considered a separate database and referenced herein by identifiers DB1, DB2, DB3, and DB4 respectively. The controller 20 communicates with each of the four separate disks via a two-way communication channel collectively designated as 22.

Each of the disks of FIG. 1 primarily consists of pages of information holding one or more records on a single page which reside in or are stored in a file. A single database file can have several extents on a single disk. It should be understood that the DBMS gets information about the physical disk addresses of the extents belonging to a file on disk from the operating system catalog which is also system specific and therefore not shown.

Many DBMS' known in the art track the page state with respect to the log records which are written as a result of an update made by a transaction. Each page has a field associated with it where the updating transaction saves the log-sequence-number (LSN) of the log record which it wrote for the latest update on the page. This field is called Page_LSN. Before a transaction makes its first update, it writes a Begin-Transaction (or Begin_Tx) log record. The LSN of the Begin_Tx, referred to as Begin_Tx_LSN, is always less than the LSN of any log record written for an update of a database by that transaction. It is assumed that the LSNs are ever increasing with time. The minimum value of the Begin_Tx_LSNs of all active transactions in a DBMS is called Commit_LSN, which is a log-sequence-number having a value prior to which there is no uncommitted transaction in the DBMS. Through Commit_LSN can be computed on a per database basis, it is assumed herein that the Commit_LSN is kept across all databases managed by the DBMS for the sake of simplicity. It is also assumed herein that the Commit_LSN is computed periodically and therefore its value naturally increases with time. At this point it should be appreciated that if a page has a Page_LSN which is less than the Commit_LSN then there is no uncommitted update of any transaction in that page.

The buffer manager 14 in a host database system additionally maintains a Recover_LSN value for each page which has been modified and which is cached in the buffer pool 16 for online page recovery purposes. The Recover_LSN value is a point in the log sequence at or after which a clean page becomes dirty. Just prior to a page state going from clean to dirty, i.e., prior to the first update to the page after the page has been read from disk, the buffer manager determines the Recover_LSN value by getting the LSN of the current end of log.

The idea of the log-sequence-number, in particular, for pages and committed data is known in the art. One skilled in the art of database locking and updating should be familiar with the LSN concept and its implementation. It is for this reason that a more thorough discussion of these LSN techniques and, in particular, the Commit_LSN technique is omitted herein. Additional information regarding the specifics of the LSN concepts and Commit_LSN techniques can be found in the reference cited in the background section of this document and in the references cited therein.

Along with an understanding of LSN, it is important to know and understand what is the database's DBMS policy of writing the transaction modified pages to disk with respect to its transaction commit processing. For instance, if a DBMS follows a "force-at-commit" policy then a transaction is considered committed only after the database pages modified by the transaction have been written to disk. A DBMS can also follow what is called a "no-force-at-commit" policy. In other words, when a transaction is about to commit it is not required that the pages modified by the transaction be written to disk. In the present method, it is assumed that the DBMS follows a "no-force-at-commit" policy.

Figure 2:
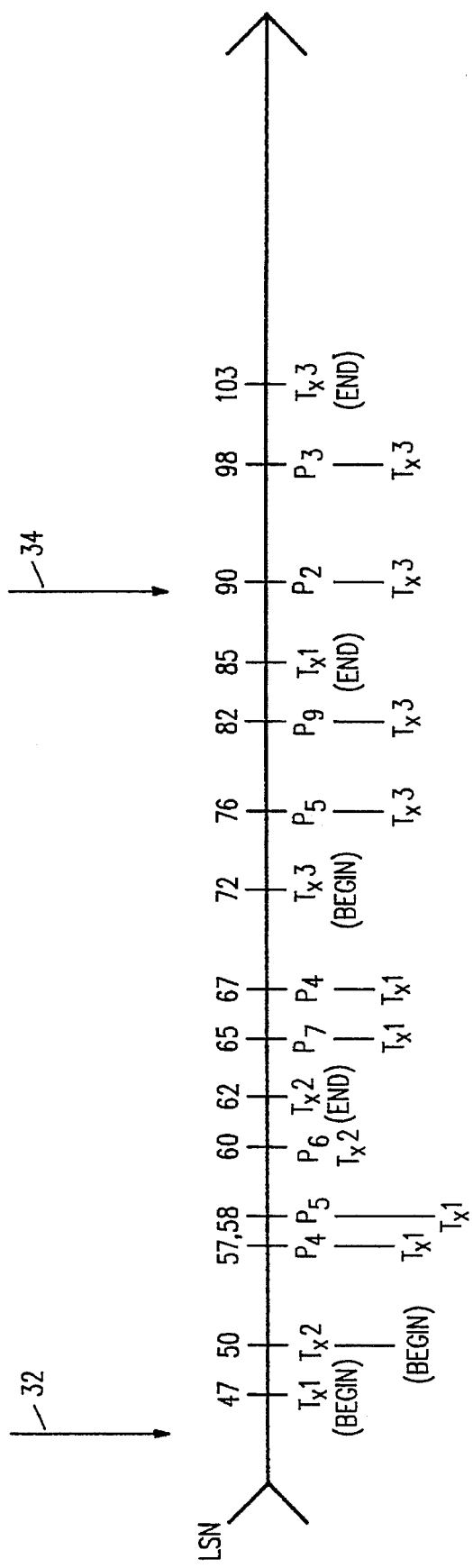
FIG. 2 is a diagram of a log-sequence timeline illustrating three separate database transactions and the LSN values associated with each transaction and page update.

In order to illustrate the time sequential nature of the LSN, reference is now made to FIG. 2. Assume that several automatic teller machines (or ATMs) are on-line with the databases of FIG. 1 and presently active. Prior to LSN 47, it can be assumed that all prior transactions on this database system have completed and the host and the controller are idle awaiting some transaction to process. This point along the log-sequence is illustrated in FIG. 2 with indicator arrow 32.

At LSN 47 database transaction Tx1 begins. In other words, a customer is active on one of the ATM machines initiating some form of a transaction with the bank's database. Thus, the Begin_Tx_LSN for Tx1 is 47. At LSN 50 another customer initiates another transaction at another ATM (because Tx1 is still active) and this transaction is Tx2. The Begin_Tx_LSN for Tx2 is 50. At LSN 57, a page of records having Page_ID P4 of DB1 is updated by transaction Tx1. Thus the Recover_LSN for P4 is 57. Since, in the present example, the customer at the first ATM machine is still currently undergoing some transaction with the bank's database system, at LSN 58 another page with Page_ID P5 of DB1 is also updated by Tx1. Thus, the Recover_LSN for P5 is 58. At LSN 60, the page having Page_ID P6 of database DB2 is updated by the Tx2 customer transacting their account on he second ATM machine giving that page a Recover_LSN value of 60. At LSN 62, the second ATM customer finishes and transaction Tx2 completes. Thus, the LSN of the End_Tx log-sequence value, referred to herein as End_Tx_LSN, for Tx2 is 62. At LSN 65, another page having Page_ID P7 of DB2 is updated by the customer of Tx1. At LSN 67, Tx1 updates P4 of DB1 again. Note that the Recover_LSN associated with P4 (which is a point in the log sequence at or after which it becomes dirty) remains 57 while its Page_LSN becomes 67, i.e., the page became dirty on LSN 57 and at LSN 67 the DBMS wrote its latest update to that page.

Another customer gains access to an ATM at a location different from the first customer because this first customer is still active on their ATM. This new customer initiates transaction Tx3 at LSN 72. Thus, the Begin_Tx_LSN for Tx3 is 72. As a consequence of Tx3, updates are made to the page having Page_ID P5 of DB1 at LSN 76 and at LSN 82 Tx3 updates the page having Page_ID P9 from DB1. Again, it should be appreciated that for P5, the Recover_LSN is 58 while the Page_LSN is 76. After several updates to records on various pages, transaction Tx1 completes at LSN 85. Thus, the End_Tx_LSN for Tx1 is 85. Meanwhile, transaction Tx3 accesses page P2 of DB1 at LSN 90 and page P3 of DB1 at LSN 98 before finishing up it processing at End_Tx_LSN of 103. At this point, the Page_LSNs for each of the updated pages P2, P3, P4, P5, P6, and P9 is as follows respectively: 90, 98, 67, 76, 60, 65 and 82.

While all this customer transacting has been occurring, a bank officer who has access to the same database as does the ATM machines, enters a database-wide query in order to support some decision support application wherein each record of the database has to be checked. Such a query could be for example, "Give me all accounts who have transacted more than 50,000 dollars in withdrawals in the last quarter." In a large financial institution, such a query would have to access millions of pages of information on disk to gather information to assist this mission critical decision. Such a large access of all the pages and records in the database would slow down the processor of the database host by consuming memory and processing time with the end result being slower database access times for other transactions. The present invention described and claimed herein provides a method for off-loading such processing to the disk controller thereby reducing the amount of processing done by the host.

With respect to the preferred embodiment of the present method for off-loading, the host must first pick a Commit_LSN value. In other words, the host must make a determination what is the earliest LSN for any ongoing transactions.

With reference still being made to FIG. 2, the query by the bank financial officer is submitted to the DBMS for evaluation at LSN 89, shown as indicator arrow 34. For simplicity, the bank officer's database-wide query will be limited to database disk DB1.

At this point along the log-sequence, the host picks LSN 72 as the Commit_LSN value because Tx1 has completed at LSN 85 and Tx2 completed at LSN 62. Only Tx3 is currently active and that transaction's Begin_Tx_LSN was 72 because, as discussed, this is the minimum value of the Begin_Tx_LSNs of all active transactions in a DBMS which is a log-sequence-number having a value prior to which there is not uncommitted transaction (i.e., Commit_LSN).

Figure 3:
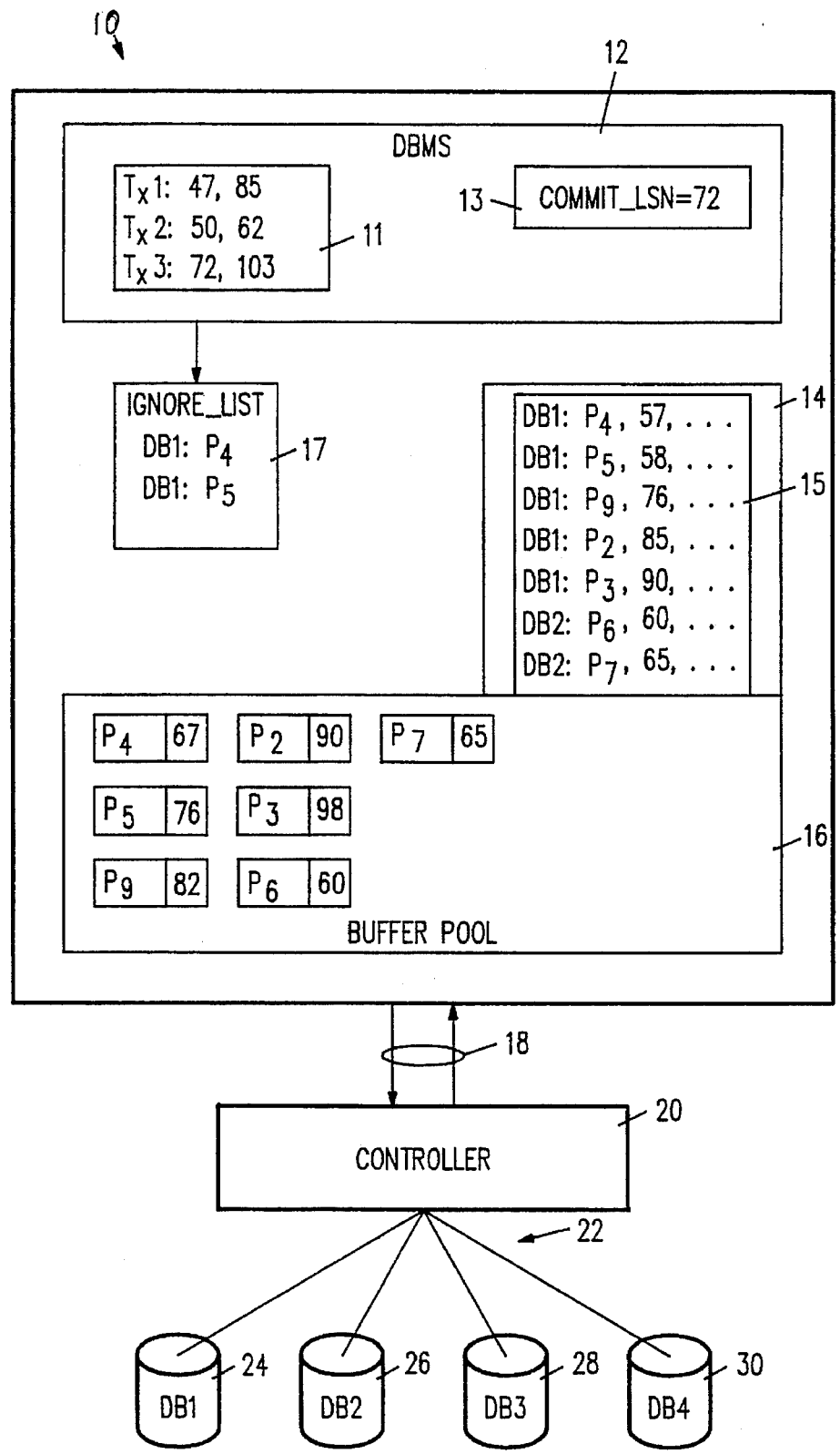
FIG. 3 is a schematic illustration of the host system of FIG. 1 corresponding to the transactions which occurred along the log-sequence timeline of FIG. 2.

Reference is now made to FIG. 3 which is an illustration of the host system of FIG. 1 corresponding to the transactions which occurred along the log-sequence timeline of FIG. 2. After the DBMS 12 has picked the Commit_LSN value prior to which there are no uncommitted transactions, the value is stored for later passing to the controller 20. As shown in FIG. 3, the Commit_LSN value of 72 is saved at a memory location illustrated at 13. Similarly, for each transaction correspondingly labeled: Tx1, Tx2, and Tx3 the DBMS has kept track of the their Begin_Tx_LSN and End_$_{Tx}$_LSN in the Transaction Table 11. Correspondingly, the Begin_Tx_LSN for Tx1, Tx2, and Tx3 are 47, 50, and 72 respectively. The End_Tx_LSN for each of the three transactions was tracked as 85, 62, and 103 respectively.

At this point in the log-sequence, the accessed pages having Page_IDs corresponding to: P4, P5, P6, P7, P9, P2, and P3 are shown cached in the host's buffer pool 16 after having been retrieved from their respective disks by the controller and updated. The buffer pool 16 may also contain other pages the transactions may have read but not updated, which are not shown. However, the Page_ID and the Page_LSN for each page is shown in the buffer pool 16. For example, the corresponding Page_LSNs of pages with Page_IDs of P4 and P5 are 67 and 76 respectively.

Within the buffer manager 14 are tracked and stored the Recover_LSN values with the corresponding Page_IDs for the pages which were updated. This is shown in the buffer manager table 15. The page having Page_ID P4 of DB1 with Recover_LSN of 57 and Page_ID P6 of DB2 with Recover_LSN of 60 have been tracked and stored. Similarly, the Recover_LSNs for the other updated pages have been tracked and stored also.

After the Commit_LSN value has been picked by the host, the host then insures that all the pages for all the databases involved in the query which were modified prior to the Commit_LSN value and cached in the host are properly processed following a DBMS policy of disk I/O prevention or not for the query off-load. Reference is now made to FIG. 3, which is an illustration of the host system of FIG. 1 corresponding to the transactions which occurred along the log-sequence timeline of FIG. 2. In accordance with the next step of the present method and following the DBMS policy of I/O prevention for query off-load, the host places the page identifiers of these particular pages in an Ignore_List, as shown at 17 in FIG. 3. The Ignore_List contains a list of pages the controller is to exclude from its processing. In other words, it is a list of pages that the host does not want the controller to process because the host has the current copy of these pages and the disk copy is not current. In order to fully implement the Ignore_List of the present invention, it is important to understand that the construction of the Ignore_List is based on what is known in the art as a Dirty Queue, i.e., a list of Page_IDs which are modified for a given database and cached in the host memory. From the buffer manager table 15 of FIG. 3, the Dirty Queue for DB1 at this point consisted of Page_ID's P4, P5, P9, P2 and P3; and the Dirty Queue for DB2 consisted of Page_ID's P6 and P7. Since the bank officer's database-wide query is restricted to DB1, the host only examines the Dirty Queue of DB1. For the host to place any given page on the Ignore_List, it must check those entries from the Dirty Queue of DB1 whose Recover_LSN value is less than the Commit_LSN when the query was submitted. In the present example, the query was submitted as LSN 89, as shown by indicator arrow 34 of FIG. 2, and the Commit_LSN value picked by the host was 72. As such and after a comparison of the Commit_LSN value with the Recover_LSN value for each page cached in the host for DB1, as shown in FIG. 3, the Ignore_List only contains the Page_ID entries of P4 and P5 because their Recover_LSN values are 57 and 58 respectively.

The number of entries in the Ignore_List can be estimated by the maximum number of entries which are allowed in any Dirty Queue since the Ignore_List is a subset of the Dirty Queue. It should be appreciated that the number of Page_IDs contained in the Ignore_List can be further reduced by including therein only those pages whose Page_IDs fall in the range of a predefined set of N pages which the controller will process or which the controller is allowed to process from any given disk.

In the other case wherein the DBMS policy is one where disk I/O prevention is not desired for the query off-load then the DBMS writes these pages having Page_IDs P4 and P5 of DB1 to disk and then waits for the corresponding disk I/Os associated with these page-writes to complete. In this case, the host would set the Ignore_List to the empty set because no pages are to be specifically ignored by the controller. Though this policy may add the overhead of extra I/Os it may be attractive in those systems wherein the number of changed pages which need to be written to disk may be small or non-existent and therefore there is no additional burden on the host processor in not using the Ignore_List and writing these pages immediately to disk.

After the DBMS has completed making its entries in the Ignore_List, then in accordance with the next step of the present method, the Ignore_List and the Commit_LSN value are made available to the controller so that the controller will not process those pages. The Commit_LSN value is provided so that the controller can determine which pages have committed data and hence process them. In addition, it is important to provide the controller with access to one or more predefined processor memory areas for the entire records or just the Record_IDs returned by the controller which satisfy the predicate evaluation.

Figure 4:
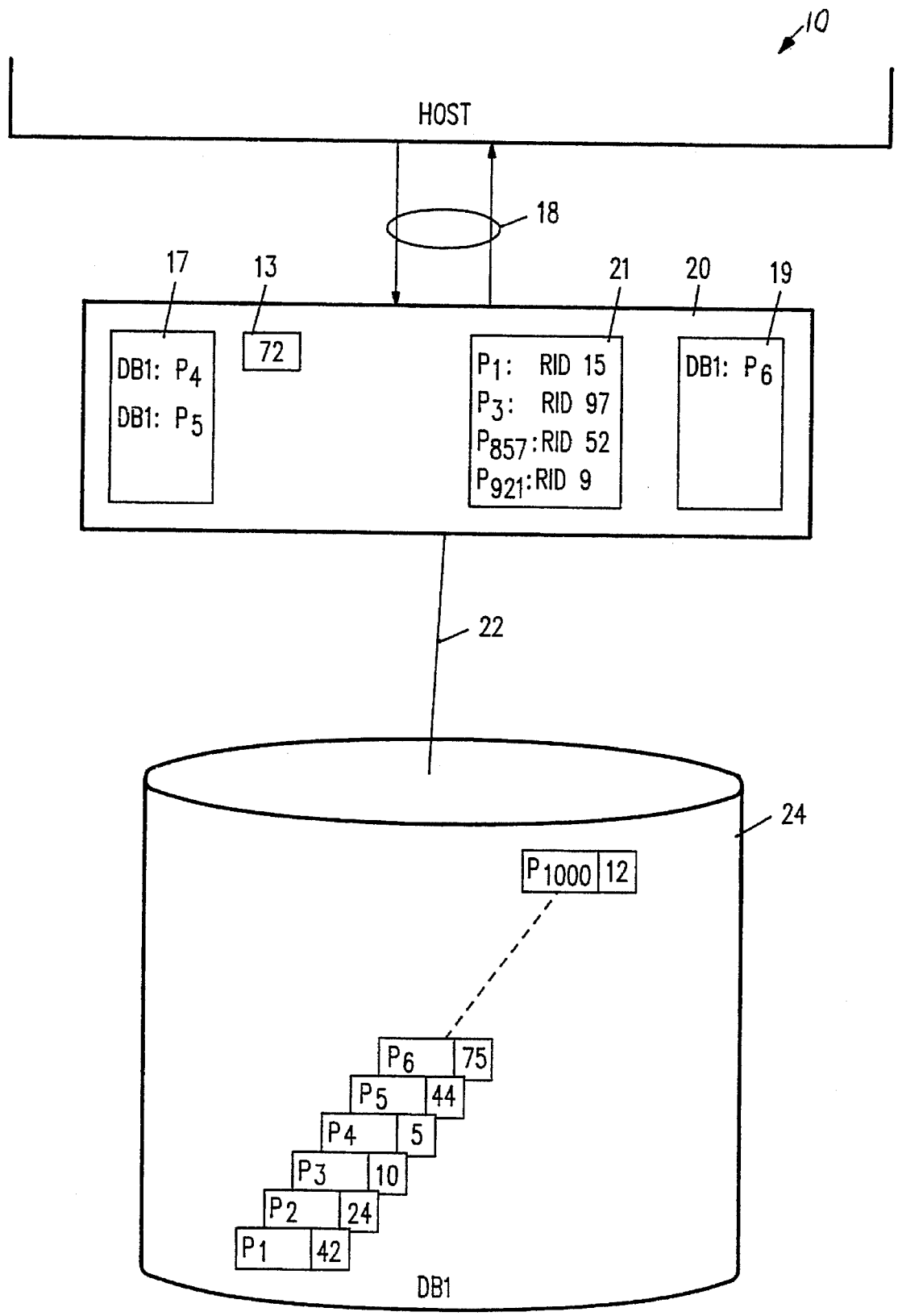
FIG. 4 is a diagram of the controller of the host system of FIG. 1 wherein the controller has received the Ignore_List and the Commit_LSN value from the host and has generated an Exception_List and an Answer_Set in accordance with the present invention.

Reference is now made to FIG. 4 which is a diagram of the controller of the host system of FIG. 1 wherein the controller has received the Ignore_List and the Commit_LSN value from the host. As shown, the controller 20 must create or otherwise have made available to it a predefined memory area for what is called herein the Exception_List. The Exception_List, shown at 19, will contain the Page_IDs and the Record_IDs which the controller could not process such that the host will know to process these pages and records because they were excepted by the controller. The records retrieved by the controller are returned to the host in what is called herein an Answer_Set, shown at 21, which is a set or list containing information about pages and records which satisfies the predicate evaluation which the host has off-loaded to the controller. Because the idea and concept of a set or list of information is known in this art and that one skilled in this art could find many ways to specifically implement the Answer_Set or the Exception_list on their particular system, a more thorough discussion herein of the construction of this list either in software or hardware is omitted.

At this point and before the controller can begin off-load processing, the host must also provide the controller with other information necessary for processing the predicate evaluation necessary to answer the query. Preferably, the host also passes to the controller the following information: that information which allows the controller to distinguish a data page from a system page so that the controller can bypass a system page; information such as the location of the Page_LSN in the page; the record layout format in a page for locating the record and its fields and determining its length; and information for recognizing an overflow record such as a pointer record and target record and the deleted record in the page. In addition, the host also preferably forwards to the controller the description of the data to be processed, a specification of the desired data to be extracted, (i.e., the predicates to be checked), and the addresses of the memory areas that were set up in the host for the controller.

Since this information passed or otherwise made accessible to the controller by the host is system specific and one skilled in this art would be sufficiently versed in how their particular system would make the above information available to the controller, an example of a direct implementation is omitted herein. Further, it should be understood that the passing back and forth between the controller and the host of, for example, the Commit_LSN 13, the Ignore_List 17, the Exception_List 19, and the Answer_Set 21 is also dependent on the implementation of the host-controller communication interface and the coding implemented thereon which facilitates such communication and the protocols specific thereto. Therefore, the preferred embodiment disclosed and claimed herein does not discuss this process because it is implementation specific and one skilled in the art would understand the communication particulars which are specific to their database.

Once the host has communicated the necessary information to the controller to perform the predicate evaluations, the controller now has the necessary information to perform the off-load function. With that information, the controller begins reading every page on its database disks in order to retrieve those records which answer the bank officer's query.

On the disk of DB1 of FIG. 4, the pages are shown and labeled P1, P2, . . . , P1000 thereby indicating that this particular database has only a 1000 pages of records in it. The page with Page_ID P1 has the Page_LSN value of 42 in the upper right corner of the page for illustration purposes because the Page_LSN value is stored with the page. Similarly, P2 has a Page_LSN of 24. Thus, each page has its corresponding Page_LSN value associated with it in some fashion depending on the design and implementation of the particular database system. The Page_LSN number must be associated with each Page_ID and be made accessible by the controller. As such and in accordance with the present invention, the controller does not read those pages that were placed by the host in the Ignore_List 17 because those pages will be processed by the host. It is assumed that there is a page level serialization for read and write in the controller, in other words, a partially written page would not be processed until the write operation completes.

The next step in the preferred embodiment of the present method involves the controller 20, for each page determining if the Page_LSN value of the page is less than the Commit_LSN value passed by the host. If it is then the controller performs the off-load processing for that page because this page was not on the Ignore_List and it is one which contains only committed data. It is an object of the present invention to have the controller perform the off-load processing only on the committed data.

The off-load processing by the controller involves the controller locating those records on the page read and evaluating the host-specified predicates (which were a subset of the package of information passed by the host) against each record for that page. In the present example, the predicate to be evaluated is to retrieve those records desired by the bank officer which is the set of all transactions more than 50,000 dollars in withdrawals in the last quarter. If the record of a particular page is one which satisfies the query predicate then this particular record or Record_ID would get placed into the Answer_Set by the controller.

If the Commit_LSN check by the controller fails, in other words, the Page_LSN is equal to or greater than the Commit_LSN, then the controller would enter it in the Exception_List. This is to indicate to the host that the controller did not process this page because it contained uncommitted data, at least with respect to the time value of the Commit_LSN value passed to the controller by the host prior to the controller's off-load processing.

In the present example, assume that one of the records on the pages with corresponding Page_IDs P1, P3, P857, and P921 properly evaluate the specific predicate sent by the host. In other words, these pages contain account information relating to withdrawal activity in amounts of 50,000 dollars or more in the last quarter. Thus, the controller would place the data corresponding to the records, RID=15 of P1, RID=97 of P3, RID=52 of P857, and RID=9 of P921 in the Answer_Set 21 of FIG. 4.

Although in the preferred embodiment as discussed, the controller's Answer_Set 21 contains the records which satisfy the host-specified predicates, the answer set returned by the controller can contain any other information which would be necessary for the host to correctly evaluate these records for final presentation to the user. For instance, the controller can also return only the selected fields of those records which the host may have requested. Such information would depend on the design of the database and the query language and format implemented thereon.

As for those pages which failed the Commit_LSN check but were not on the Ignore_List, the controller places their Page_IDs on the Exception_List. As discussed, the Exception_List contains the Page_IDs which the controller could not process such that the host will know to process the records contained therein. As shown in FIG. 4, the Exception_List 19 contains Page_ID P6 because the Page_LSN value for this page is 75 and therefore this page failed the check of whether the Page_LSN value is less than the Commit_LSN value for the page. This means that this page may contain uncommitted data.

It should be understood that the Exception_List could also contain the Record_IDs for the overflow records or record pointers, i.e., records which point to overflow records in other pages, which could not be processed by the controller. In the instance wherein a record is a target of an overflow record's pointer record then the controller ignores that record and moves on since that record would be processed by the host.

After the controller has completed the off-load processing of all pages not on the Ignore_List, the next step of the preferred embodiment involves the controller forwarding or otherwise making accessible to the host the Exception_List and the Answer_Set. The host processes the pages identified in the Exception_List in addition to those pages in the Ignore_List.

Once the host has access to the two lists returned by the controller, the host would latch those pages which failed the Commit_LSN check in the controller and do the Commit_LSN check again by using the value of the current Commit_LSN to insure that the answer to the user's query contains no uncommitted data. If this Commit_LSN check fails, the host would process each record the usual way, for instance, by locking it, etc. Otherwise, the host would evaluate the predicate without locking the records. The host evaluates the predicates for the overflow records in its usual way because the sequence of processing the records may not be important for the answer to the query. The host may also further process the records returned by the controller to derive the desired answers, for example, by processing the residual predicates for which the controller lacks the capability or the function. The host then produces the desired answer to the query from these identified pages before consolidating these pages with the answers returned by the controller.

It should be understood that the query results produced by the processing disclosed herein provides cursor stability semantics, i.e., the results would have only committed data but it may not be all committed data. Such semantics are superior to the unlocked read case (or dirty reads) because it maintains the intra-record transaction consistency of data. In other words, if transactions are guaranteed to preserve consistency constraints which are explicitly declared to the host or are application-level constraints then those constraints that involve only the contents of a single record, e.g., columns C1 and C2 of a record having a constraint C1+C2= 10 would be valid for the records retrieved by the controller. Inter-record constraints, e.g., referential constraints, and uniqueness may or may not be valid. Only the repeatable read semantics can guarantee that such constraints are also valid.

It is important herein to point out that in the fairly common case where the controller has its own cache, the present method allows exploitation of the controller's cache for host anticipated pages. In other words, those pages which failed the Commit_LSN check would be treated preferentially so as to reduce the I/O times when the host requests such pages. This can be achieved by providing a hint to the controller. For instance, although the above-described method has been directed to host and controller processing for a query which does not update the set of records which it retrieved from the database, it is still possible for a query to retrieve a set of records and subsequently update them. In order to update any particular record, the host requires access to those page for reasons such as space management and maintenance of recovery information. After the controller has returned the records and the RIDs which satisfied the predicates to the host, the host would soon retrieve such pages in order to update them. Since these records have already been read from disk to the controller's cache for processing, the I/O times for retrieving those pages has consequently been reduced by the controller. By anticipating access to these pages by the host, the controller can leave these pages in the controller's cache.

Although the preferred embodiment has been discussed in terms of a disk controller, the present invention is not to be considered in any way as limited to a host off-loading predicate evaluations only to a disk controller. Other controller-type hardware such as, for instance, a specialized processor or other database subsystems that have common access to the same disk space as the host are to be considered within the scope of the present invention.

In summary, the method moves processing on non-reused data for ad-hoc query processing or report generation to the disk subsystem. In such a manner, host storage and processing power is better utilized and channel utilization is effectively reduced. In addition, concurrent updates by other transactions are allowed which does not expose uncommitted data to a query that may be partially or wholly processed by the off-load processor. Further, the method eliminates the need for any locking functionality at the controller, reduces the amount of synchronization between host and the controller unit considerably, and yet exposes only committed data to a query.

This invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed and desired to be secured by United States Letters Patent is:

1. A method for a database system to off-load to a controller the extraction of committed data to answer a query while updates could be performed on such data, comprising the steps of:

a) said system setting up information required for the controller to process a query on committed data, the information including a Commit_LSN which indicates an earliest time at which any currently active transactions commenced, and a plurality of pages, each page having associated therewith a Page_LSN which indicates when the page was last updated;

b) said system communicating said set up information to a controller;

c) said controller determining, for each page, whether the page contains committed or uncommitted data, based on whether the associated Page_LSN is less than Commit_LSN;

d) said controller processing pages which have only committed data; and e) said system processing the pages with uncommitted data and data returned by said controller.

2. A method as defined in claim 1 wherein step (c) further comprises said controller identifying and ignoring those pages which may have uncommitted data.

3. A method as defined in claim 1 wherein step (c) further comprises said controller communicating information on data which said controller could not process to said system.

4. A method as defined in claim 1, wherein step (a) further comprises said system identifying modified pages cached in its memory which are relevant for query processing.

5. A method as defined in claim 4, wherein the step of identifying relevant modified pages further comprises the steps of:

1) a) if disk I/O prevention is desired then said system identifying those relevant pages as ones that said controller should ignore and placing the identifiers of those relevant pages in an ignore list; and 1) b) otherwise, said system writing to disk those relevant modified pages and setting the ignore list to the empty set; and 2) said system forwarding the ignore list to said controller.

6. A method as defined in claim 1, wherein step (a) further comprises said system picking a Commit_LSN value and communicating the Commit_LSN to said controller.

7. A method as defined in claim 1, wherein step (b) further comprises said system communicating a description of the data to be processed, a specification of the desired data to be extracted, and addresses of said system memory areas for results and page identifiers and record identifiers which said controller should not process to said controller.

8. A method as defined in claim 1, wherein step (c) further comprises said controller reading every page identified by said system except those in an ignore list from disk and performing for each page the steps of:

a) if the page's Page_LSN <Commit_LSN communicated by said system then said controller extracting from that page qualifying data desired by said system and adding the extracted data to an answer set; and b) otherwise said controller adding the page's Page_ID to an exception list.

9. A method as defined in claim 1, wherein step (c) further comprises said controller reading every page identified by said system except those in an ignore list from its cache and, if not found in the cache then reading the page from disk and performing for each page the steps of:

a) if the page's Page_LSN<Commit_LSN communicated by said system then said controller processing the pages and adding qualifying data desired by said system to an answer set; and b) otherwise said controller adding the Page_ID of the page to an exception list.

10. A method as defined in claim 1, wherein step (c) further comprises said controller communicating an answer set and an exception list to said system.

11. A method as defined in claim 1, wherein step (d) further comprises said system processing pages and records identified in an exception list and the pages in the ignore list.

12. A method as defined in claim 1, wherein step (d) further comprises said system producing desired answers from pages returned by the controller.

13. A method as defined in claim 1, wherein step (d) further comprises said system consolidating its processed data with the answer set returned by said controller.

14. A method as defined in claim 1, wherein step (c) further comprises said controller processing a subset of pages with committed data.

15. A method as defined in claim 1, wherein step (c) further comprises said system off-loading the processing of all pages of the databases to said controller.

16. A distributed database computer system comprising:

a) processor means for processing information within said distributed system and comprising:

1) database management means for reading and updating database information and comprising:

a transaction table for tracking transaction states;

a memory area dedicated to retaining a Commit_LSN value, which indicates an earliest time at which any currently active transactions commenced, and an ignore list for tracking pages to be ignored on a per query basis, each page having associated therewith a Page_LSN which indicates when the page was last updated; and means for off-loading system based processing;

2) buffer pool means for caching data and managed by a buffer manager having a buffer-manager-table to track data cached in said buffer pool;

b) controller means for reading and writing data comprising;

means for processing the system-based processing off loaded by the database management means by determining, for each page, whether the page contains committed or uncommitted data, based on whether the associated Page_LSN is less than Commit_LSN;

c) communication channel means connected to said system processor means and said controller means for enabling communication therebetween; and d) at least one database disk in communication with said controller means for storage of database information.

* * * * *